J. W. HUGHES.
LIQUID DISPENSING MECHANISM.
APPLICATION FILED SEPT. 12, 1914.
1,295,508.
Patented Feb. 25, 1919.
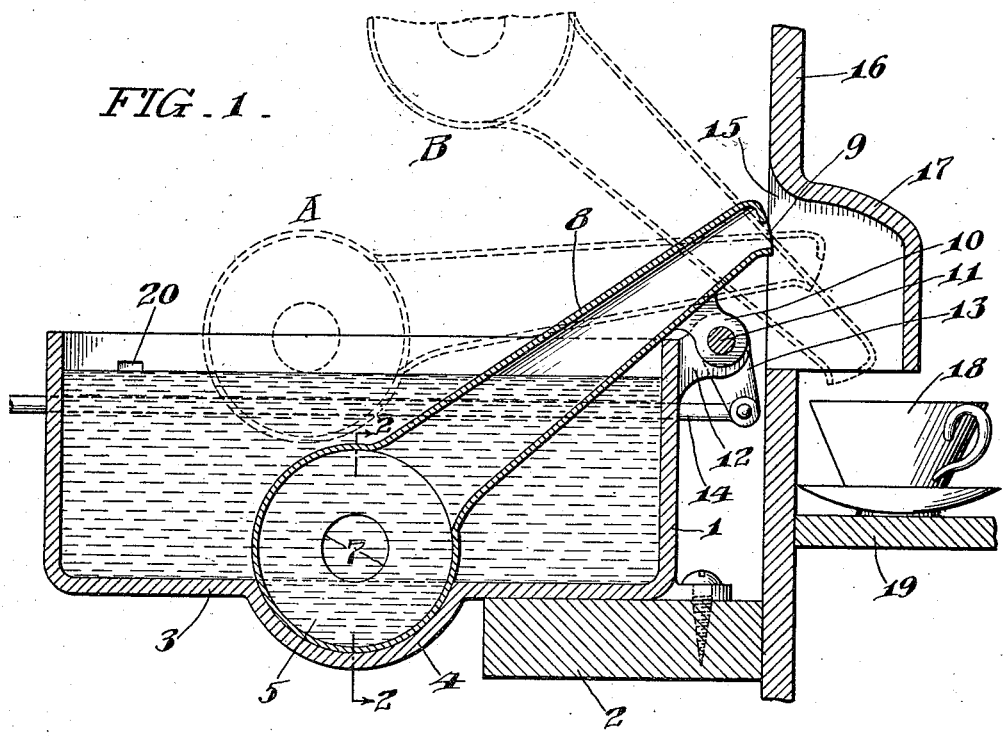
FIG. 1.
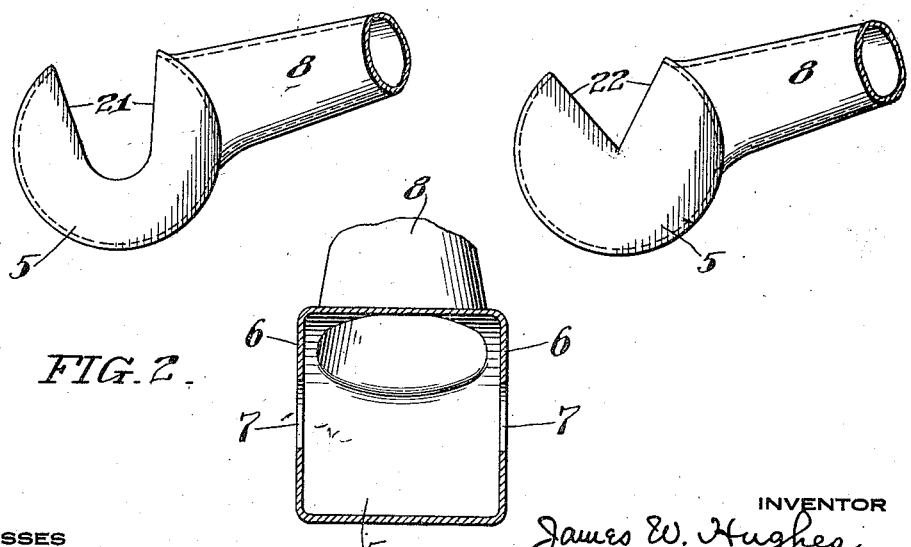
FIG. 3. FIG. 4.
FIG. 2.
WITNESSES
C. H. Wissmann
E. W. Smith.
INVENTOR
James W. Hughes
BY
ATTORNEY

UNITED STATES PATENT OFFICE.

JAMES W. HUGHES, OF NARBERTH, PENNSYLVANIA, ASSIGNOR TO HUGHES-LIPPINCOTT COMPANY, A CORPORATION OF NEW JERSEY.

LIQUID-DISPENSING MECHANISM.

1,295,508.   Specification of Letters Patent.   Patented Feb. 25, 1919.

Application filed September 12, 1914. Serial No. 861,354.

*To all whom it may concern:*

Be it known that I, JAMES W. HUGHES, a citizen of the United States, and resident of Narberth, county of Montgomery, and State of Pennsylvania, have invented an Improvement in Liquid-Dispensing Mechanism, of which the following is a specification.

This invention relates to a liquid dispensing mechanism, and consists of certain improvements which are fully set forth in the following specification and shown in the accompanying drawings which form a part thereof.

The object of the invention is to provide a device for removing measured quantities of liquid from a main container or reservoir and dispensing the said quantity to a suitable cup or like receptacle. The device, while particularly adapted for use with automatic mechanism, such as used in restaurants where the liquid to be dispensed is regulated by coin controlled mechanism, is not, however, limited to this specific use and may be employed in other ways, as will be understood. In devices for automatically dispensing liquids it has been found in practice that there is great difficulty in obtaining uniform quantities of the liquid at successive dispensing operation, for example, the cup into which the liquid is discharged may be entirely filled at one operation and at the following operation be only half or partially filled. In my present invention this objection has been entirely overcome and the dispensing means operates to successively deliver the same measured quantity of liquid at each operation and each cup therefor is accurately filled to substantially the same level.

It has for a further object to provide a dispensing means wherein the final or last dipper of liquid prior to emptying the main reservoir contains the same measured quantity as those preceding.

My invention also comprehends details of construction which, together with the features above specified, will be better understood by reference to the drawings, in which:—

Figure 1 represents a sectional elevation of a liquid dispensing mechanism embodying my invention; Fig. 2 represents a section of the dipper device taken on line 2—2 of Fig. 1; Fig. 3 represents a side elevation of a modified form of dipper; and Fig. 4 represents a similar elevation of still another modification.

1 designates a suitable receptacle for containing liquids to be dispensed such as soup, milk, coffee, or the like, and forms a reservoir in which the main supply of the liquid is adapted to be retained. The receptacle 1 is preferably mounted upon a suitable support such as 2, and has a portion of its bottom 3 depressed, as shown at 4, to form a pocket to hold an amount of the liquid corresponding to the measured quantity dispensed and also to receive the body 5 of the dipper or means for removing and discharging measured quantities of the liquid from the reservoir. In the present instance the body 5 of the dipper is preferably cylindrical in the plane of its swinging movement and the contour of the pocket 4 is of similar configuration in order to accurately conform to the shape of the body 5 which in its normal inoperative position accurately fits and seats within the pocket, thus displacing the liquid which is otherwise held in the pocket.

As here shown, the side walls 6 of the dipper body 5 are each provided with an opening 7 for the purpose of permitting a certain part of the liquid, the excess of the predetermined amount, to be discharged or overflow into the reservoir as the dipper is removed, thus insuring the delivery of the same quantity of liquid at each operation of the dipper. By making the dipper with a circular bottom in the plane of the swinging movement of the dipper, and having an overflow concentric with the curvature of said curved bottom, the dipper will dip and discharge uniform measured quantities irrespective of the level of the liquid in the reservoir.

8 designates a spout, preferably formed integral with the body 5 and forming a channel to conduct the liquid to the discharge or nozzle opening 9. The spout 8, in the present instance, is provided with an apertured ear or lug 10 fixedly secured to a rock shaft 11, which is preferably mounted in lugs or bearings 12 of the receptacle 1, the said shaft being operated by a crank arm 13 and rod 14. The rod 14 forms the means for causing the dipper to be elevated above the reservoir or lowered into it, and may be controlled either manually or by suitable coin controlled mechanism. The discharge opening of the spout is situated adjacent an opening 15 formed in the front wall 16 of the inclosing cabinet or like device, and preferably this opening is shielded or protected by a hood 17, the lower portion of which is open, so that as the nozzle is tilted to its discharging position the contents of the dipper will be emptied into a cup 18 or the like, positioned upon a suitable shelf 19 at the front of the cabinet, as will be understood.

Referring to Fig. 1, it will be noted that the reservoir 1 is open at the top so that the dipper has a free path of movement from filling position to discharging position, and it will further be seen that a suitable means, such as the overflow opening 20, is provided at the side of the reservoir 1 to limit and determine the maximum height of the liquid in the reservoir. This feature is desirable since otherwise the level might be sufficient to cause a partial filling of the spout as well as the body of the dipper and thus the first quantities discharged would be greater than the predetermined quantity desired. In respect to the level of the liquid in the reservoir lowering below the maximum level, that is immaterial as the dipper is so shaped that it always dips the same measured quantity for any variable level down to the bottom of the reservoir, a capacity not possessed by any other dipper dispensing device that I am aware of.

In Fig. 3 I have shown the body 5 as having its side walls cut away or recessed as shown at 21 so that the dipper may more quickly discharge the liquid in excess of the desired measured quantity. In Fig. 4 another modification of the dipper discharge opening is shown, and in which I have preferred to cut a V-notch 22 in each of the side walls for a similar purpose, the point of the V being located at the center of the circular side wall.

In the operation of the device the dipper normally occupies the position shown in full lines, Fig. 1, and in which position under conditions of a full reservoir, the dipper as well as a portion of the spout will be filled with the liquid. As soon, however, as the rod 14 is operated to swing the dipper about its pivot 11, the excess liquid will begin to flow out of the side openings 7 thereby lowering the level as the dipper is elevated, and this flow continues until the dipper reaches the position where the lower edge of the openings are at the level of the main body of liquid. Such a position is shown in dotted lines at A. Here it will be noted that the body of the dipper contains a quantity of liquid corresponding to the predetermined amount to be delivered to the cup 18 and which is ready to be discharged by a further upward tilting of the body 5. The continued upward movement of the dipper, therefore, causes the measured quantity of liquid to pass through the spout 8 and discharge from its nozzle into a suitable receiving means so that when the dipper has reached the point indicated in dotted lines at B, the body has been entirely emptied and the dipper may be returned into the reservoir for another filling operation.

In view of the fact that the pocket 4 has a predetermined size corresponding to the desired measured quantity of liquid to be dispensed at a single operation, it will be evident that the dipper can remove at each operation the same amount of liquid at each movement until the reservoir is entirely empty. This is so for the reason that the last quantity of the liquid, remaining after the main portion of the reservoir has been emptied, is located in the pocket 4 and is adapted to be displaced by the body of the dipper and consequently enters the dipper through the side openings 7 and rises to the required level. It will be understood that the reservoir 1 is adapted to hold a quantity of liquid which is preferably a multiple of the measured quantity to be discharged and hence even though the level of the liquid in the reservoir falls to its lowest point, the dipper member will discharge the same uniform quantity to the waiting receptacle.

It will therefore be apparent that the measured or proper quantity of liquid dipped at one operation is determined by the size of the segment cut by any chord which is tangent to the overflow opening 7, and the level of the liquid in the receptacle 1 is therefore immaterial and does not affect the proper measured quantity being discharged at each movement of the dipper. It will further be noted that the opening 7 is preferably circular and the dipper will retain a constant quantity of liquid which is proportional to the segment, the chord of which is a constant distance from the center of the discharge circle, this being true so long as the discharge circular opening and the circumference of the wall of the dipper are concentric. For example, the dipper will remove the same quantity of liquid whether it dips from a level corresponding to the horizontal bottom of the receptacle or from a level corresponding to the maximum level adjacent the top of the receptacle, since the quantity dipped by the dipper is determined by the area of the segment formed by the chord which is tangent to the discharge opening, and these segments are always equal no matter what is the position of the dipper, as in any case the equal chords will subtend equal segments.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to protect by Letters Patent, is:—

1. In a device of the character stated, the combination of a reservoir for liquid in which the liquid level may vary, a dipper pivoted to swing into and out of the reservoir said dipper having a dipping receptacle of cylindrical form in the plane of its movement about its pivot and provided with an overflow opening concentric with and near the axis of curvature of said receptacle, whereby said receptacle will hold an equal quantity of liquid for all positions above the liquid level of the reservoir until the discharging position is reached, and a pocket in the bottom of the reservoir into which the dipper receptacle is snugly received and the depth of said pocket approximating the radial distance from the bottom of the dipper receptacle to the overflow opening, whereby the entire content of the reservoir may be dipped out.

2. In a device of the character stated, a reservoir for liquid having a depressed portion in the bottom of a capacity adapted to hold a quantity of the liquid corresponding to a measured amount to be dispensed at one operation, a dipper pivoted on a fixed transverse axis and curved in the plane of its movement and adapted to seat snugly in said depressed portion to displace the liquid therefrom into said dipper, said dipper being provided with an opening to admit the displaced liquid into said dipper the bottom of said opening being substantially on the level of the bottom of the reservoir and top of the depressed portion in the bottom, and the curved portion of the dipper continued above the bottom of the receptacle, a discharge spout carried by said dipper and as a continuation thereof from the curved bottom portion, and means to elevate said dipper whereby the entire liquid content of the reservoir is discharged through said spout to a point exterior of said reservoir.

3. In a device of the character stated, a reservoir for a supply of liquid, a pivoted dipper having its bottom circular in shape in the plane of its movement about its pivotal axis and provided with a circular discharge opening at the side said opening being arranged concentrically with respect to the circular bottom wall of said dipper, a spout connected to the circular part of said dipper at a point above the side opening of the dipper when in its lowermost position and all other positions up to the time of discharge of the liquid into the spout, and means to elevate said dipper to discharge the contents thereof through said spout to the exterior of said receptacle.

In testimony of which invention, I hereunto set my hand.

JAMES W. HUGHES.

Witnesses:
 DOROTHY CHERTAH,
 E. W. SMITH.